US011909102B2

(12) United States Patent
Tang et al.

(10) Patent No.: US 11,909,102 B2
(45) Date of Patent: Feb. 20, 2024

(54) BASE STATION ANTENNAS HAVING PARTIALLY-SHARED WIDEBAND BEAMFORMING ARRAYS

(71) Applicant: CommScope Technologies LLC, Hickory, NC (US)

(72) Inventors: Chengcheng Tang, Murphy, TX (US); Rongrong Zhang, Suzhou (CN); HongHui Chen, Suzhou (CN)

(73) Assignee: CommScope Technologies LLC, Claremont, NC (US)

( * ) Notice: Subject to any disclaimer, the term of this patent is extended or adjusted under 35 U.S.C. 154(b) by 162 days.

(21) Appl. No.: 17/524,778

(22) Filed: Nov. 12, 2021

(65) Prior Publication Data

US 2022/0166129 A1 May 26, 2022

(30) Foreign Application Priority Data

Nov. 20, 2020 (CN) ......................... 202011306605.5

(51) Int. Cl.
*H01Q 1/24* (2006.01)
*H01Q 21/26* (2006.01)
(Continued)

(52) U.S. Cl.
CPC ............... *H01Q 1/246* (2013.01); *H01Q 3/36* (2013.01); *H01Q 5/42* (2015.01); *H01Q 5/48* (2015.01); *H01Q 21/26* (2013.01)

(58) Field of Classification Search
CPC ............ H01Q 1/246; H01Q 5/40; H01Q 5/42; H01Q 5/45; H01Q 5/47; H01Q 5/48; H01Q 5/49; H01Q 21/26
See application file for complete search history.

(56) References Cited

U.S. PATENT DOCUMENTS

2014/0375502 A1 12/2014 Foo
2017/0294715 A1 10/2017 Wu et al.
2021/0384641 A1* 12/2021 Tang ...................... H01Q 21/08

FOREIGN PATENT DOCUMENTS

CN 111555031 A 8/2020
EP 3686991 A1 7/2020
(Continued)

OTHER PUBLICATIONS

"Notification of Transmittal of the International Search Report and the Written Opinion of the International Searching Authority, or the Declaration for corresponding International Application No. PCT/US2021/058205, dated Feb. 25, 2022, (13 pages)".

*Primary Examiner* — Daniel Munoz
(74) *Attorney, Agent, or Firm* — Myers Bigel, P.A.

(57) ABSTRACT

Base station antennas comprise a multi-column, multiband beamforming array that includes a first sub-array of first radiating elements, a second sub-array of second radiating elements and a third sub-array of third radiating elements. The first radiating elements are configured to operate in a first frequency band, the second radiating elements are configured to operate in a second frequency band, and the third radiating elements are configured to operate in both the first frequency band and the second frequency band. Each of the first through third sub-arrays has the same number of columns. A width of the first sub-array exceeds a width of the third sub-array, and a width of the third sub-array exceeds a width of the second sub-array.

9 Claims, 9 Drawing Sheets

(51) Int. Cl.

| | |
|---|---|
| ***H01Q 3/36*** | (2006.01) |
| ***H01Q 5/42*** | (2015.01) |
| ***H01Q 5/48*** | (2015.01) |

(56) References Cited

FOREIGN PATENT DOCUMENTS

| | | | |
|---|---|---|---|
| WO | 2019018276 A1 | | 1/2019 |
| WO | WO-2022199821 A1 | * | 9/2022 |

* cited by examiner

BASE STATION ANTENNAS HAVING PARTIALLY-SHARED WIDEBAND BEAMFORMING ARRAYS

FIELD

The present application claims priority to Chinese Patent Application No. 202011306605.5, filed Nov. 20, 2020, the entire content of which is incorporated herein by reference as if set forth in its entirety.

FIELD

The present invention generally relates to cellular communications and, more particularly, to base station antennas for cellular communications systems that have beamforming arrays.

BACKGROUND

Cellular communications systems are well known in the art. In a typical cellular communications system, a geographic area is divided into a series of regions that are referred to as "cells," and each cell is served by a base station. The base station may include baseband equipment, radios and base station antennas that are configured to provide two-way radio frequency ("RF") communications with subscribers that are positioned throughout the cell. Typically, a base station antenna includes a plurality of phase-controlled arrays of radiating elements, with the radiating elements arranged in one or more vertically-extending columns when the antenna is mounted for use. These vertically-extending columns are often referred to as linear arrays. Each linear array generates an antenna beam or, if the linear array is formed using dual-polarized radiating elements, forms an antenna beam at each of two orthogonal polarizations.

The antenna beams that are formed by a linear array (or by multiple linear arrays that are used to transmit a common RF signal) are often characterized by their Half Power Beam Width ("HPBW") in the so-called azimuth and elevation planes. The azimuth plane refers to a horizontal plane that bisects the base station antenna and that is parallel to the plane defined by the horizon. The elevation plane refers to a vertical plane that bisects the base station antenna and that is perpendicular to the azimuth plane. Herein, "horizontal" refers to a direction that is generally parallel to the plane defined by the horizon, and "vertical" refers to a direction that is generally perpendicular relative to the plane defined by the horizon.

As demand for cellular service has grown, cellular operators have upgraded their networks to increase capacity and to support new generations of service. When these new services are introduced, the existing "legacy" services typically must be maintained to support legacy mobile devices. Thus, as new services are introduced, either new cellular base stations must be deployed or existing cellular base stations must be upgraded to support the new services. In order to reduce cost, many cellular base stations support two, three, four or more different types or generations of cellular service. However, due to local zoning ordinances and/or weight and wind loading constraints, there is often a limit as to the number of base station antennas that can be deployed at a given base station. To reduce the number of antennas, many operators deploy so-called "multiband" antennas that communicate in multiple frequency bands to support multiple different cellular services.

Cellular operators are currently deploying equipment that will support the so-called fifth generation of cellular service, which is typically referred to as "5G" service. One aspect of 5G service is the deployment of base station antennas that include one or more beamforming arrays. A beamforming array refers to a multi-column array of radiating elements that is capable of generating narrowed antenna beams that can be electronically steered in a desired direction. In most 5G implementations, each column of radiating elements in the beamforming array is connected to a separate port of a beamforming radio (or to two ports of a beamforming radio if dual-polarized radiating elements are used). The beamforming radio may generate an RF signal based on a baseband data stream and may then divide this RF signal into a plurality of sub-components (namely a sub-component for each radio port associated with a particular polarization). Each sub-component of the RF signal is fed to a respective one of the columns of radiating elements in the beamforming array. The amplitude and/or phase of each sub-component may be set in the radio so that the individual antenna beams formed by each column of radiating elements constructively combine to generate a more-focused composite antenna beam that has higher gain and a narrowed beamwidth in the azimuth plane. The amplitudes and/or phases of the sub-components may also be controlled so that the main lobe of the composite antenna beam (i.e., the portion of the antenna beam having the highest gain) will point in a desired direction in the azimuth plane. In other words, a beamforming array is capable of generating more highly-focused, higher gain antenna beams and can electronically scan these antenna beams to point in different directions in the azimuth plane. Moreover, the shape and/or pointing direction of the antenna beams may be changed on a time slot-by-time slot basis in a time division duplex transmission scheme in order to increase the antenna gain in the direction of selected users during each time slot. Base station antennas that include beamforming arrays may support significantly higher throughputs than conventional fourth generation base station antennas.

SUMMARY

Pursuant to embodiments of the present invention, base station antennas are provided that include a multi-column, multiband, longitudinally-extending beamforming array. These beamforming arrays include a first sub-array of first radiating elements, a second sub-array of second radiating elements and a third sub-array of third radiating elements. The first radiating elements are configured to operate in a first frequency band, the second radiating elements are configured to operate in a second frequency band that is different from the first frequency band, and the third radiating elements are configured to operate in both the first frequency band and the second frequency band. Each of the first through third sub-arrays has a same number of columns. A width of the first sub-array exceeds a width of the third sub-array, and a width of the third sub-array exceeds a width of the second sub-array.

In some embodiments, the third sub-array is positioned between the first sub-array and the second sub-array.

In some embodiments, an average spacing in a longitudinal direction between the first radiating elements in a first column of the first sub-array exceeds an average spacing in the longitudinal direction between the third radiating elements in a first column of the third sub-array. In some embodiments, an average spacing in the longitudinal direction between the third radiating elements in the first column of the third sub-array exceeds the average spacing in the longitudinal direction between the second radiating elements in a first column of the second sub-array.

In some embodiments, the second radiating elements have a same design as the third radiating elements but have a different design than the first radiating elements. In other embodiments, the first radiating elements have a different design than the second radiating elements and the third radiating elements, and the second radiating elements have a different design than the third radiating elements.

In some embodiments, the first frequency band is at lower frequencies than the second frequency band.

In some embodiments, at least some of the first radiating elements are configured to receive higher power sub-components of a first frequency band RF signal than are at least some of the third radiating elements. In some embodiments, at least some of the second radiating elements are configured to receive higher power sub-components of a second frequency band RF signal than are at least some of the third radiating elements.

Pursuant to embodiments of the present invention, base station antennas are provided that include a multi-column, multiband beamforming array comprising a first sub-array of first radiating elements, a second sub-array of second radiating elements and a third sub-array of third radiating elements. A first average distance between the columns in the first sub-array differs from a second average distance between the columns in the second sub-array or a first average vertical separation between adjacent first radiating elements in a first column of the first sub-array differs from a second average vertical separation between adjacent second radiating elements in a first column of the second sub-array.

In some embodiments, the first average distance differs from the second average distance.

In some embodiments, the first average distance differs from a third average distance between the columns in the third sub-array.

In some embodiments, the first radiating elements are configured to operate in a first frequency band, the second radiating elements are configured to operate in a second frequency band that is different from the first frequency band, and the third radiating elements are configured to operate in both the first frequency band and the second frequency band.

In some embodiments, the third average distance differs from the second average distance.

In some embodiments, the first average distance exceeds the second average distance.

In some embodiments, the third average distance exceeds the second average distance.

In some embodiments, the first average vertical separation differs from the second average vertical separation.

In some embodiments, the first average vertical separation differs from a third average vertical separation between adjacent third radiating elements in a first column of the third sub-array.

In some embodiments, the first radiating elements are configured to operate in a first frequency band, the second radiating elements are configured to operate in a second frequency band that is different from the first frequency band, and the third radiating elements are configured to operate in both the first frequency band and the second frequency band.

In some embodiments, the third average vertical separation differs from the second average vertical separation.

In some embodiments, the first average vertical separation exceeds the third average vertical separation.

In some embodiments, the third average vertical separation exceeds the second average vertical separation.

In some embodiments, the first radiating elements have a same design as the second radiating elements but have a different design than the third radiating elements.

In some embodiments, the third radiating elements have a same design as the second radiating elements but have a different design than the first radiating elements.

In some embodiments, the first radiating elements have a different design than the second radiating elements and the third radiating elements, and wherein the second radiating elements have a different design than the third radiating elements.

DETAILED DESCRIPTION

Cellular operators are deploying an increasing number of base station antennas that include beamforming arrays in order to support 5G cellular service. Many cellular operators are deploying base station antennas that include multi-column beamforming arrays that operate in the 2.3-2.69 GHz frequency band (herein "the T-band") or a portion thereof as well as multi-column beamforming arrays that operate in the 3.3-4.2 GHz frequency band (herein "the S-band") or a portion thereof. Typically, these beamforming arrays include four columns of radiating elements each, although more columns may be used (e.g., eight, sixteen or even thirty-two columns of radiating elements).

It may be challenging to include both a T-band and an S-band beamforming array in a single base station antenna while also meeting cellular operator requirements on the maximum width and length of the base station antenna. While these requirements may differ based on cellular operator, jurisdiction, and location where the antenna will be deployed, there are many situations where the width of the base station antenna must be no more than 498 mm or no more than 430 mm, and there are also situations where the length of the antenna must be 1500 mm or less. In addition, in some situations, the base station antenna must also include linear arrays of "low-band" radiating elements that operate in part or all of the 617-960 MHz frequency band and/or linear arrays of "mid-band" radiating elements that operate in part or all of the 1427-2690 MHz frequency band.

Figure 1A:
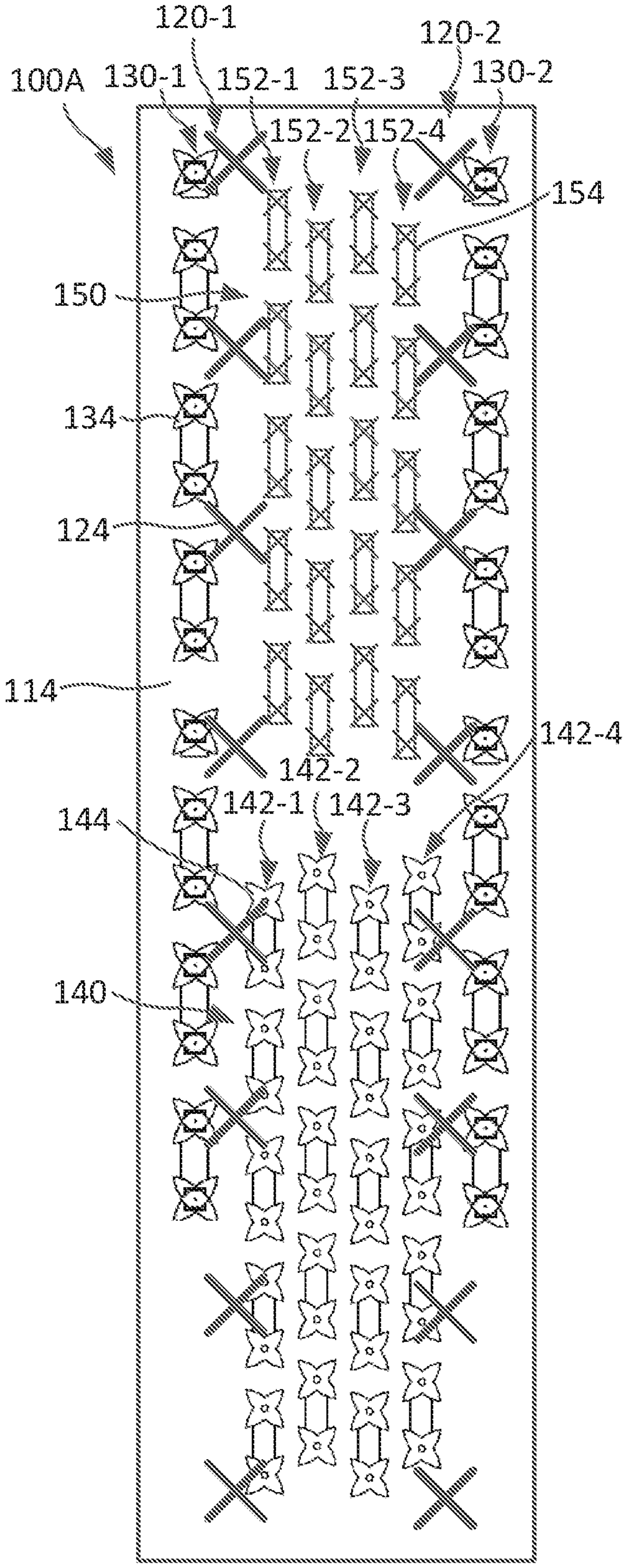
FIGS. 1A-1C are schematic front views (with the radome removed) of several conventional base station antennas that each support beamforming in two different frequency bands.
Figure 1B:
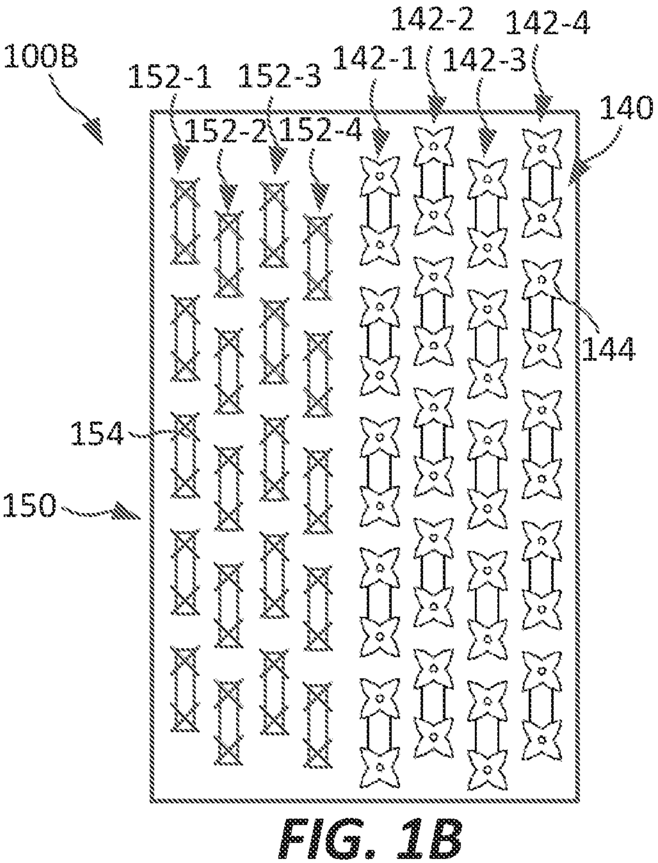
Figure 1C:
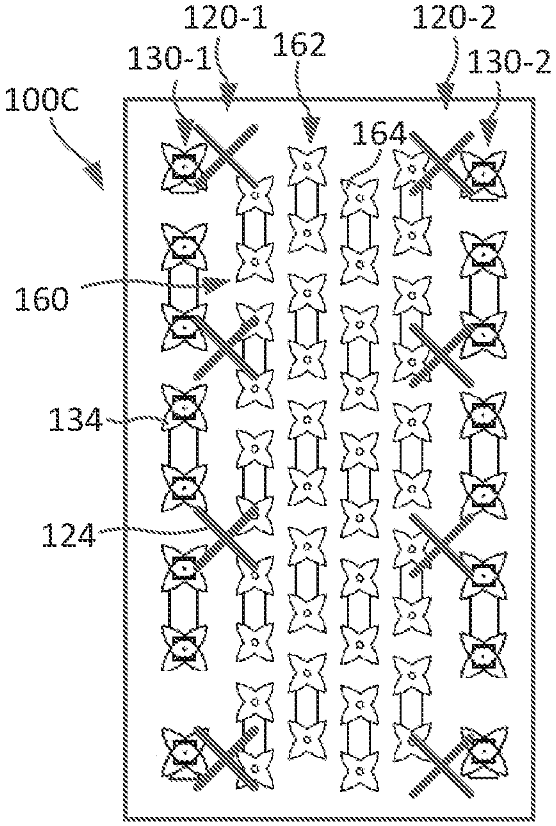

Several solutions have been proposed for providing base station antennas that include both T-band and S-band beamforming arrays. FIGS. 1A-1C are schematic front views (with the radome omitted) of base station antennas 100A-100C, respectively, that illustrate these conventional solutions.

As shown in FIG. 1A, in a first solution, the T-band and S-band beamforming arrays are vertically stacked, typically in a central region of a reflector 114 of the base station antenna 100A. The base station antenna 100A includes a pair of low-band linear arrays 120-1, 120-2 of low-band radiating elements 124 that are configured to operate in the 617-960 MHz frequency band, or a portion thereof. Herein, when multiple of the same elements are included in an antenna, the elements may be referred to individually by their full reference numeral (e.g., linear array 120-2) and collectively by the first part of their reference numerals (e.g., the linear arrays 120). The base station antenna 100A further includes a pair of mid-band linear arrays 130-1, 130-2 of mid-band radiating elements 134 that are configured to operate in all or part of the 1427-2690 MHz frequency band. The first mid-band linear array 130-1 is positioned between the first low-band linear array 120-1 and a first side edge of the reflector 114, and the second mid-band linear array 130-2 is positioned between the second low-band linear array 120-2 and a second side edge of the reflector 114. The T-band beamforming array 140 includes four columns 142-1 through 142-4 of T-band radiating elements 144 that are configured to operate in some or all of the 2300-2690 MHz frequency band, and is positioned between the lower portions of the first and second linear arrays of low-band radiating elements 120-1, 120-2. The S-band beamforming array 150 includes four columns 152-1 through 152-4 of S-band radiating elements 154 that are configured to operate in some or all of the 3300-4200 MHz frequency band, and is positioned between the upper portions of the first and second linear arrays of low-band radiating elements 120-1, 120-2. The base station antenna 100A of FIG. 1A can readily be implemented to have a width of less than 498 mm, and can even meet the 430 mm width requirement. However, the base station antenna 100A of FIG. 1A will have a length that exceeds the 1500 mm limit unless a very small number of radiating elements are included in each of the columns 142, 152 of the beamforming arrays 140, 150, which is generally unacceptable, as the elevation beamwidth of such beamforming arrays 140, 150 will be too large.

Referring to FIG. 1B, in a second solution, a base station antenna 100B is provided that includes a T-band beamforming array 140 and an S-band beamforming array 150 that are arranged in a side-by-side manner. The T-band beamforming array 140 and the S-band beamforming array 150 may be identical to the like-numbered beamforming arrays of FIG. 1A and hence further description thereof will be omitted. As shown in FIG. 1B, this solution typically allows the base station antenna 100B to meet the 1500 mm limit on the length of the antenna, but does not leave room for the low-band and mid-band linear arrays 120, 130 if the 498 mm limit on the width of the antenna is to be met.

As shown in FIG. 1C, in a third solution, a base station antenna 100C is provided that includes a single, multiband, multi-column beamforming array 160 that acts as both a T-band beamforming array and as an S-band beamforming array. The beamforming array 160 is implemented using wideband radiating elements 164 that operate across the full 2300-4200 MHz frequency band (herein "the Q-band"). Diplexers (not shown) are provided in the base station antenna 100C that allow both T-band and S-band radios to be coupled to the shared beamforming array 160. The base station antenna 100C further includes a pair of low-band linear arrays 120-1, 120-2 and a pair of mid-band linear arrays 130-1, 130-2 which may be implemented using the same elements, and which may be located in the same positions on the reflector 114, as the like numbered linear arrays of base station antenna 100A (although these arrays 120, 130 are shown as having fewer radiating elements 124, 134 as compared to the corresponding arrays in base station antenna 100A). The use of a shared beamforming array 160 allows the base station antenna 100C to meet both the 498 mm width requirement and the 1500 mm length requirement. However, the use of diplexers increases the insertion loss for the base station antenna 100C, which lowers the antenna gain, and hence the supportable throughput at both T-band and S-band. Additionally, the spacing between columns (i.e., the horizontal distance between adjacent vertically-oriented linear arrays of radiating elements) in a beamforming array is typically set to be about one half a wavelength of the center frequency of the operating frequency band of the array. The shared beamforming array 160 operates at two relatively widely separated frequency bands, and hence the spacing between adjacent columns 162 of radiating elements 164 in the shared beamforming array 160 cannot be set at an optimum distance for both frequency bands, which results in degraded performance.

Pursuant to embodiments of the present invention, base station antennas are provided that include a multiband, multi-column beamforming array that has at least three distinct multi-column sub-arrays. The first sub-array may include a plurality of columns of first radiating elements that are configured to operate in a first frequency band, the second sub-array may include a plurality of columns of second radiating elements that are configured to operate in a second frequency band that is different than the first frequency band, and the third sub-array may include a plurality of columns of third radiating elements that are configured to operate in both the first and second frequency bands. The first and third sub-arrays may together form a first beamforming array that operates in the first frequency band, and the second and third sub-arrays may together form a second beamforming array that operates in the second frequency band. The base station antenna further includes a plurality of diplexers that allow the beamforming radios for each of the first and second frequency bands to share the third radiating elements. In an example embodiment, the first and third sub-arrays may together form a T-band beamforming array, and the second and third sub-arrays may together form an S-band beamforming array.

In the example embodiment where the multiband beamforming array supports beamforming at T-band and at S-band, the first radiating elements in the first sub-array may be spaced apart from each other in the horizontal and/or vertical directions by amounts that may be selected to optimize beamforming and antenna beam sidelobe performance for the T-band communications. Likewise, the second radiating elements in the second sub-array may be spaced apart from each other in the horizontal and/or vertical directions by amounts that may be selected to optimize beamforming and antenna beam sidelobe performance for the S-band communications. The third radiating elements in the third sub-array may be spaced apart from each other in the horizontal and/or vertical directions by amounts that may be selected as a compromise between T-band and S-band performance.

The widths of the first through third sub-arrays may be different due to the differences in the horizontal spacing between the columns of radiating elements. For example, the first sub-array may be wider than the third sub-array, and the third sub-array may be wider than the second sub-array.

The multiband beamforming arrays according to embodiments of the present invention may fit within the width and length constraints set by many cellular operators. The number of radiating elements included in the third sub-array may be set based on, for example, the area on the reflector of the antenna available for the multiband beamforming array, with more radiating elements being included in the third sub-array the smaller the amount of area available. Since the first radiating elements may be spaced apart from each other in the horizontal and vertical directions by amounts that are designed to optimize performance at T-band, and the second radiating elements may be spaced apart from each other in the horizontal and vertical directions by amounts that are designed to optimize performance at S-band, the multiband array may exhibit good beamforming and sidelobe suppression performance. Moreover, since diplexers are only required on the third radiating elements, the insertion loss of the antenna may be reduced as compared to the insertion loss of the base station antenna 100C of FIG. 1C (which has diplexers connected to all of the radiating elements and hence experiences higher losses).

In some embodiments, the radiating elements in the first, second and third sub-arrays may be spaced apart by different amounts in either or both the horizontal and vertical directions. For example, in some embodiments, the columns in the first sub-array may be spaced apart from each other by a first average distance, the columns in the second sub-array may be spaced apart from each other by a second average distance, and the columns in the third sub-array may be spaced apart from each other by a third average distance. The first average distance may exceed the third average distance, and the third average distance may exceed the second average distance. As another example, vertically-adjacent first radiating elements in the columns of the first sub-array may have a first average vertical separation, vertically-adjacent second radiating elements in the columns of the second sub-array may have a second average vertical separation, and vertically-adjacent third radiating elements in the columns of the third sub-array may have a third average vertical separation. In some embodiments, the first average vertical separation may exceed the third average vertical separation, and the third average vertical separation may exceed the second average vertical separation.

Example base station antennas having multiband beamforming arrays according to embodiments of the present invention will now be discussed in greater detail with reference to FIGS. 2A-5.

Figure 2A:
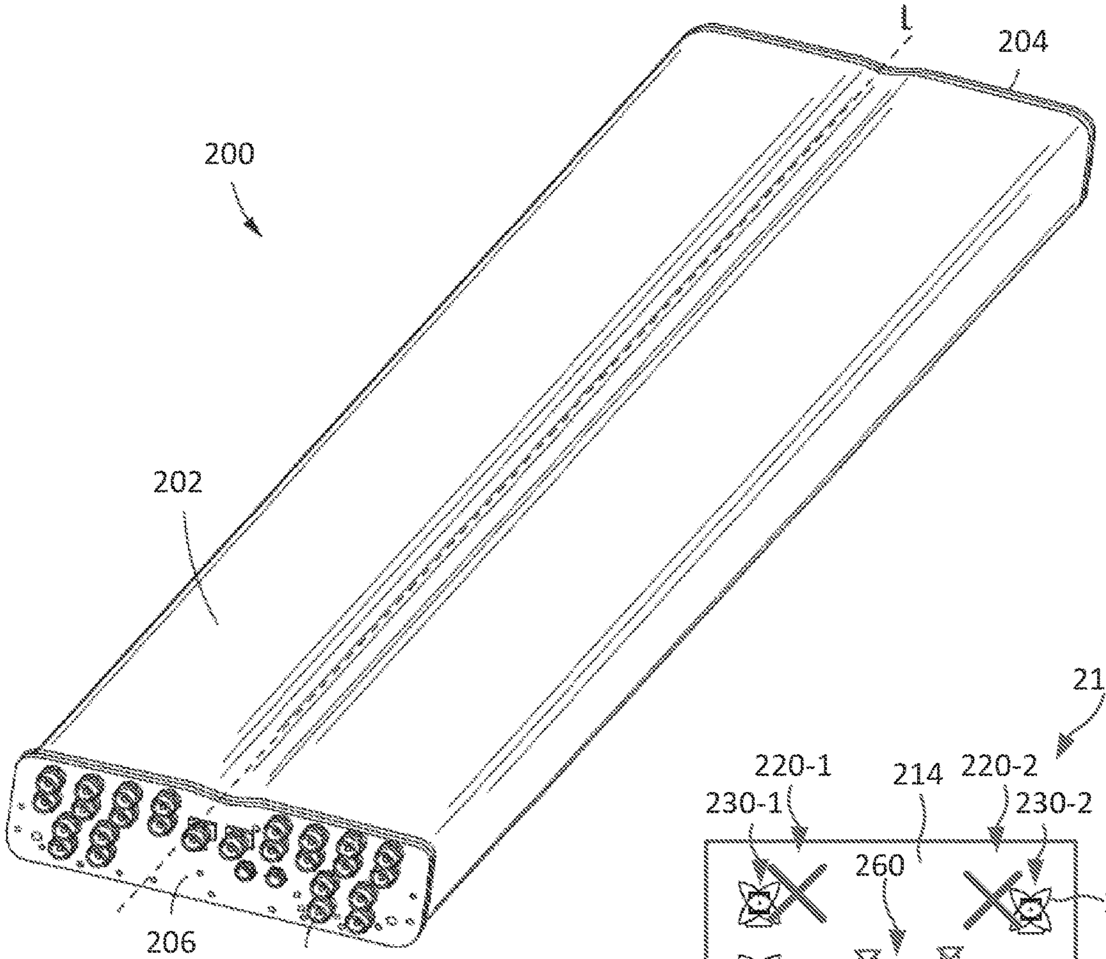
FIG. 2A is a perspective view of a base station antenna according to embodiments of the present invention.
Figure 2B:
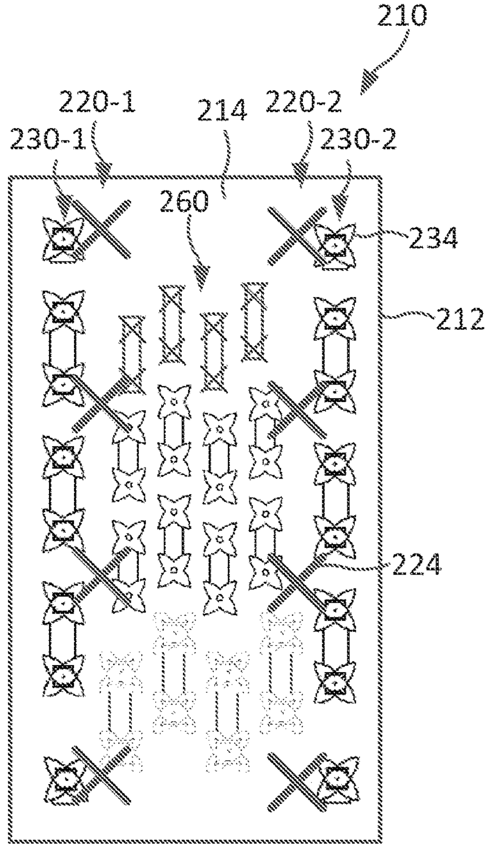
FIG. 2B is a schematic front view of an antenna assembly of the base station antenna of FIG. 2A.
Figure 2C:
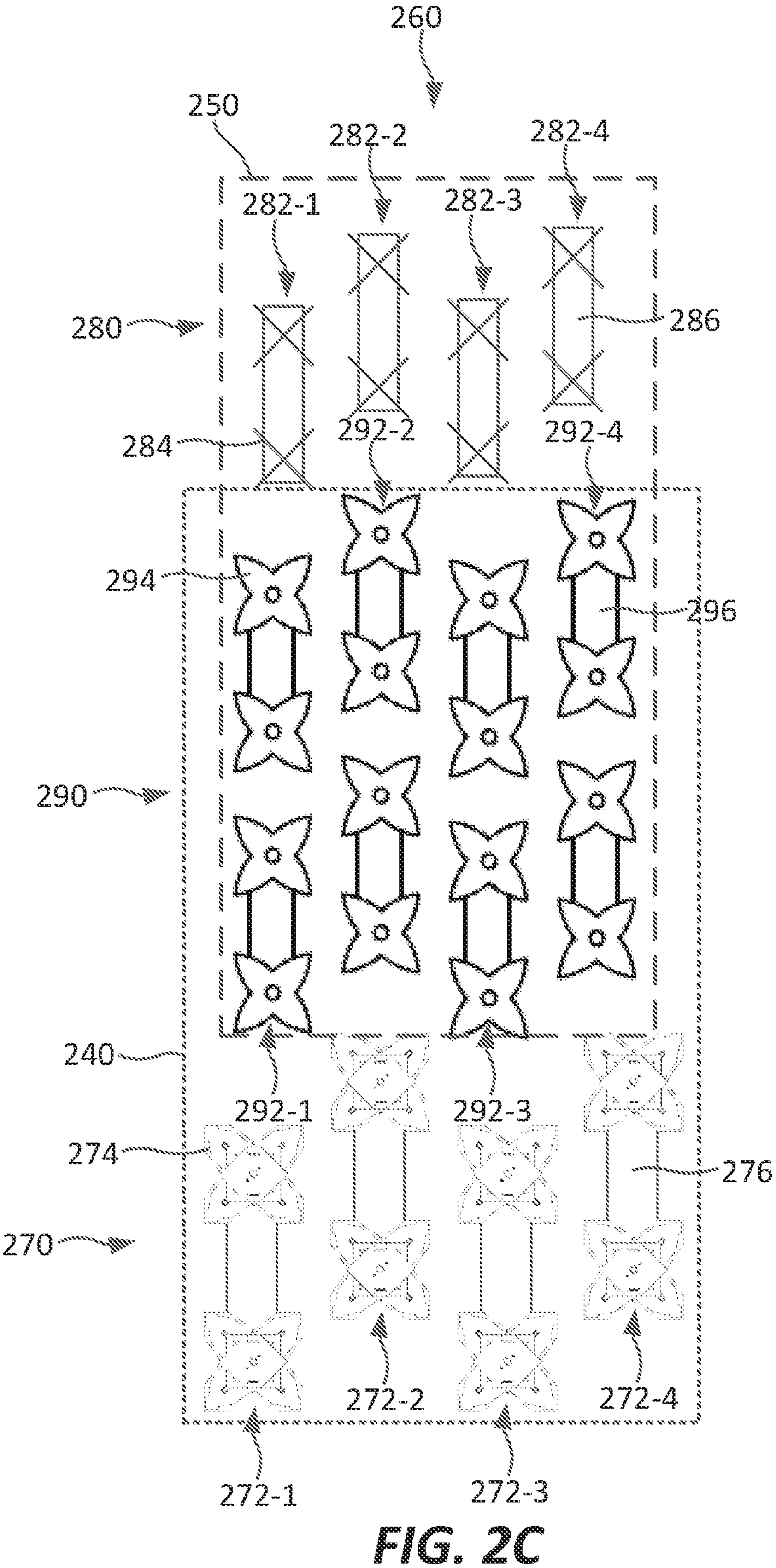
FIG. 2C is an enlarged schematic front view of a partially-shared, multiband, multi-column beamforming array that is included in the base station antenna of FIGS. 2A-2B.
Figure 2D:
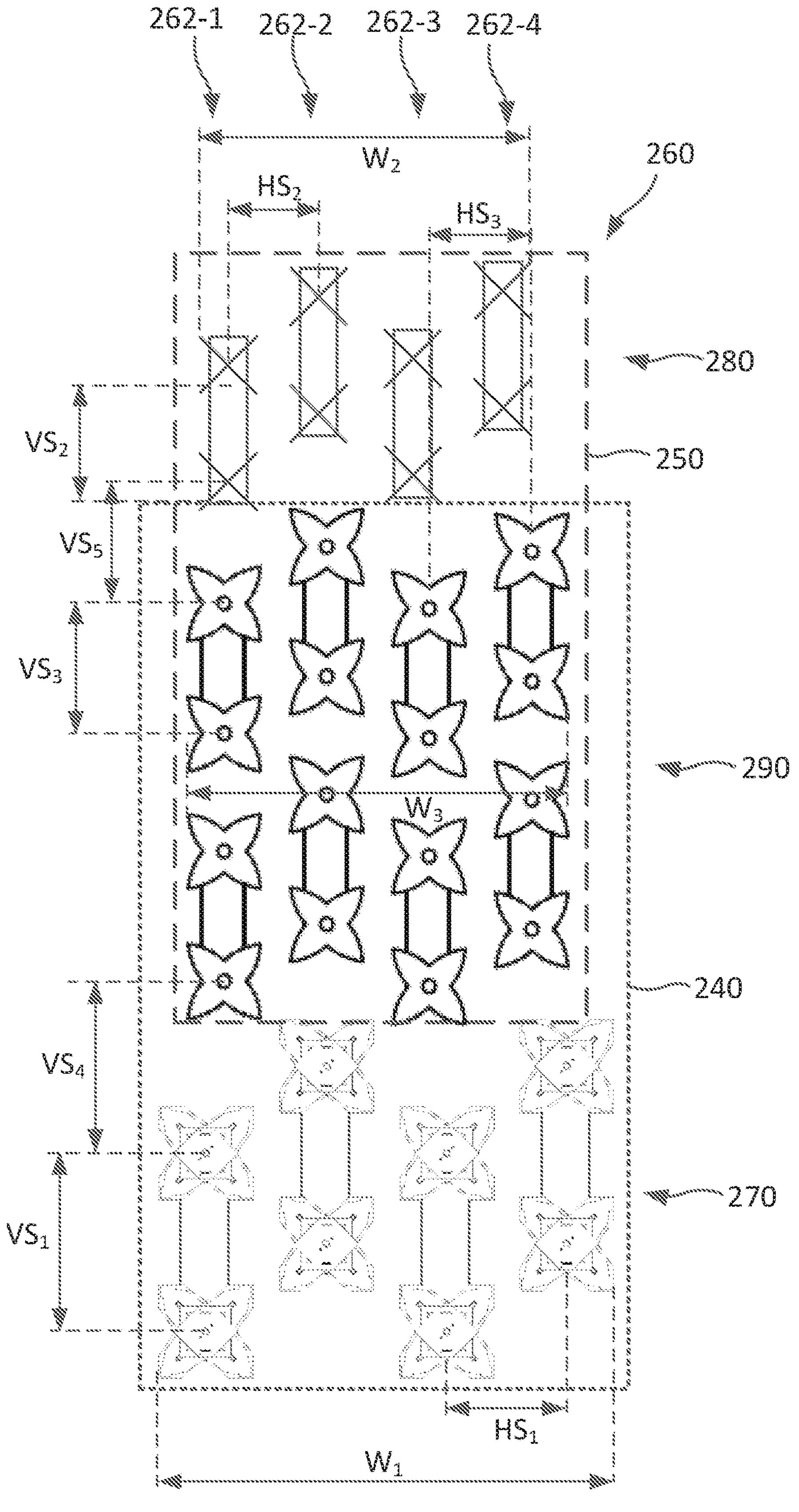
FIG. 2D is another enlarged schematic front view of a partially-shared, multiband, multi-column beamforming array included in the base station antenna of FIGS. 2A-2B that illustrates the horizontal and vertical spacing of the radiating elements in the different sub-arrays thereof.
Figure 2E:
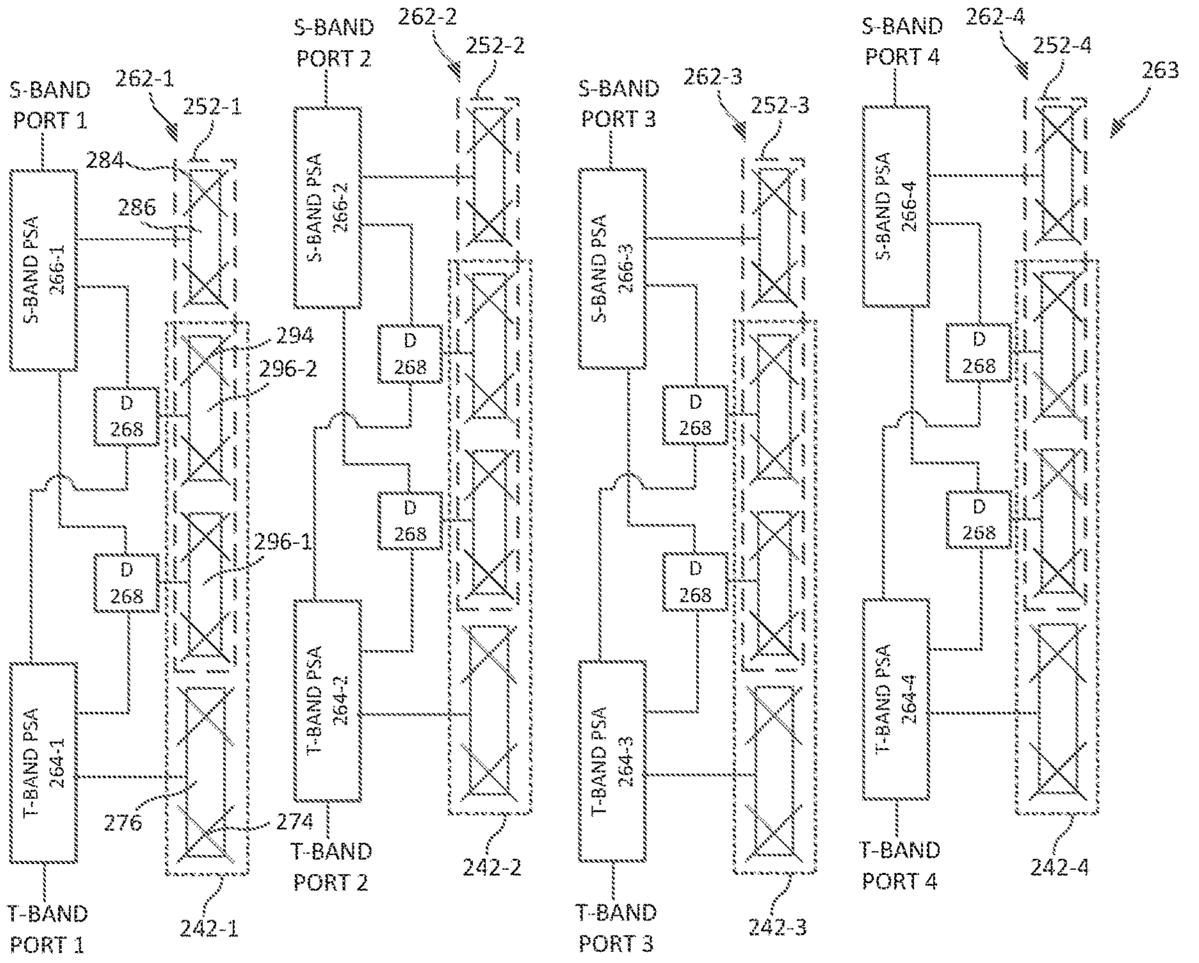
FIG. 2E is a block diagram of the feed network for the partially-shared beamforming array of FIG. 2C.

FIG. 2A is a perspective view of a base station antenna 200 according to certain embodiments of the present invention. FIG. 2B is a schematic front view of an antenna assembly 210 of the base station antenna 200 of FIG. 2A. FIGS. 2C and 2D are enlarged schematic front views of a partially-shared multiband, multi-column beamforming array 260 that is included in the base station antenna 200 of FIGS. 2A-2B. FIG. 2E is a block diagram of the feed network for the partially-shared beamforming array 260 of FIGS. 2C-2D.

As shown in FIG. 2A, the base station antenna 200 is an elongated structure that extends along a longitudinal axis L. The base station antenna 200 may have a tubular shape with a generally rectangular cross-section. The antenna 200 includes a radome 202 and a top end cap 204. One or more mounting brackets (not shown) may be provided on the rear side of the antenna 200 which may be used to mount the antenna 200 onto an antenna mount (not shown) on, for example, an antenna tower. The antenna 200 also includes a bottom end cap 206 which includes a plurality of RF connector ports 208 mounted therein. The RF connector ports 208 may be connected to corresponding ports of one or more radios via cabling connections (not shown). The antenna 200 is typically mounted in a vertical configuration (i.e., the longitudinal axis L may be generally perpendicular to a plane defined by the horizon) when the antenna 200 is mounted for normal operation. The radome 202, top cap 204 and bottom cap 206 may form an external housing for the antenna 200. An antenna assembly 210 (FIG. 2B) is contained within the housing. The antenna assembly 210 may be slidably inserted into the radome 202, typically from the bottom before the bottom cap 206 is attached to the radome 202.

As shown in FIG. 2B, the antenna assembly 210 includes a backplane 212 that includes a reflector 214. The reflector 214 may comprise a metallic sheet that serves as a ground plane for the radiating elements (discussed below) that are mounted thereon, and also acts to redirect forwardly much of the backwardly-directed radiation emitted by these radiating elements.

As is also shown in FIG. 2B, the base station antenna 200 includes two low-band linear arrays 220-1, 220-2 of low-band radiating elements 224 and two mid-band linear arrays 230-1, 230-2 of mid-band radiating elements 234. Each low-band radiating element 224 is mounted to extend forwardly from the reflector 214, and may be configured to transmit and receive RF signals in the 617-960 MHz frequency band or a portion thereof. Similarly, each mid-band radiating element 234 is mounted to extend forwardly from the reflector 214, and may be configured to transmit and receive RF signals in the 1427-2690 MHz frequency band or a portion thereof. The first mid-band linear array 230-1 is positioned between the first low-band linear array 220-1 and a first side edge of the reflector 214, and the second mid-band linear array 230-2 is positioned between the second low-band linear array 220-2 and a second side edge of the reflector 214.

The base station antenna 200 further includes a partially-shared, multiband, multicolumn beamforming array 260 that includes four columns 262-1 through 262-4 of radiating elements. Adjacent columns 262 are staggered with respect to each other in the vertical direction in order to reduce coupling between radiating elements in adjacent columns 262. The partially-shared beamforming array 260 is positioned between the lower and middle portions of the first and second linear arrays of low-band radiating elements 220-1, 220-2. The partially shared beamforming array 260 includes at least three sub-arrays 270, 280, 290 that are each configured to operate in a respective different (although in some cases overlapping) frequency band. These sub-arrays 270, 280, 290 may each have different configurations in terms of, for example, the horizontal spacing between columns of radiating elements, the vertical spacing between radiating elements in a column, and/or in the type of radiating element included in the sub-array. FIG. 2C is an enlarged view of the partially-shared beamforming array 260 of FIG. 2B.

As shown in FIG. 2C, the first sub-array 270 includes four columns 272-1 through 272-4 of T-band radiating elements 274. In the depicted embodiment, each column 272 includes two T-band radiating elements 274, but it will be appreciated that more than two T-band radiating elements 274 may be included in each column 272 in other embodiments depending on, for example, the desired elevation beamwidth and the length of the base station antenna 200. Each T-band radiating element 274 may be configured to operate in some or all of the 2300-2690 MHz frequency band.

The second sub-array 280 includes four columns 282-1 through 282-4 of S-band radiating elements 284. In the depicted embodiment, each column 282 includes two S-band radiating elements 284, but it will be appreciated that more than two S-band radiating elements 284 may be included in each column 282 in other embodiments. Each S-band radiating element 284 may be configured to operate in some or all of the 3300-4200 MHz frequency band.

The third sub-array 290 includes four columns 292-1 through 292-4 of Q-band radiating elements 294. In the depicted embodiment, each column 292 includes four Q-band radiating elements 294, but it will be appreciated that more or less than four Q-band radiating elements 294 may be included in each column 292 in other embodiments Each Q-band radiating element 294 may be configured to operate in some or all of the 2300-4200 MHz frequency band. Each Q-band radiating element 294 may be connected to a diplexer so that it can be fed with both T-band and S-band RF signals, as will be explained in greater detail below with reference to FIG. 2E.

The first and third sub-arrays 270, 290 together form a T-band beamforming array 240. The second and third sub-arrays 280, 290 together form an S-band beamforming array 250. Thus, the multiband beamforming array 260 implements two single-band beamforming arrays, namely the T-band beamforming array 240 and the S-band beamforming array 250, by sharing the radiating elements of the third sub-array 290 across both single-band beamforming arrays.

The radiating elements 274, 284, 294 are mounted in pairs on feedboards 276, 286, 296, respectively. As known in the art, a feedboard is a printed circuit board or equivalent structure that one or more radiating elements may be mounted on. Each feedboard 276, 286, 296 is configured to receive RF signals from other elements of a feed network for the array 260, to split each received RF signal into sub-components, and to pass each sub-component to a respective one of the radiating elements 274, 284, 294 mounted on the feedboard 276, 286, 296.

The first through third sub-arrays 270, 280, 290 may be generally aligned along a vertical axis L, with the third sub-array 290 positioned between the first and second sub-arrays 270, 280. While the first sub-array 270 of T-band radiating elements 274 is illustrated as being below the third sub-array 290 of Q-band radiating elements 294 and the second sub-array 280 of S-band radiating elements 284 is illustrated as being above the third sub-array 290 of Q-band radiating elements 294, it will be appreciated that the locations of the first and second sub-arrays 270, 280 may be reversed in other embodiments.

As shown in FIG. 2C, in some embodiments, each sub-array 270, 280, 290 may be implemented using a different type of radiating element. For example, the first sub-array 270 may be implemented using T-band radiating elements 274 that are configured to transmit and receive RF signals in the 2300-2690 MHz frequency band, the second sub-array 280 may be implemented using S-band radiating elements 284 that are configured to transmit and receive RF signals in the 3300-4200 MHz frequency band, and the third sub-array 290 may be implemented using Q-band radiating elements 294 that are configured to transmit and receive RF signals in the 2300-4200 MHz frequency band.

Each radiating element 224, 234, 274, 284, 294 that is included in base station antenna 200 may be a dual-polarized radiating element that includes a first polarization radiator and a second polarization radiator. For example, each radiating element 224, 234, 274, 284, 294 may be a cross-dipole radiating element that includes a slant −45° dipole radiator and a slant +45° degree dipole radiator. It will be appreciated, however, that in other embodiments different types of radiating elements may be used to implement any of the arrays 220, 230, 260 (and this is true with respect to all of the embodiments disclosed herein). Thus, for example, in other embodiments the radiating elements 224, 234, 274, 284, 294 may be implemented as patch radiating elements, slot radiating elements, horn radiating elements or any other suitable radiating element, and these radiating elements may be single polarized or dual-polarized radiating elements.

FIG. 2D is another enlarged schematic front view of the partially-shared beamforming array 260 that illustrates how the radiating elements in the different sub-arrays may be spaced apart from each other in the horizontal and/or vertical directions by amounts that may be selected to better optimize the beamforming and antenna beam sidelobe performance for both T-band and S-band communications.

As shown in FIG. 2D, the distance between adjacent columns 272 of the first (T-band) sub-array 270 is defined as the distance $HS_1$ in FIG. 2D, and the vertical separation between adjacent T-band radiating elements 274 in each column 272 of the first sub-array 270 is defined as the distance $VS_1$ in FIG. 2D. Similarly, the distance between adjacent columns 282 of the second (S-band) sub-array 280 is defined as the distance $HS_2$, and the vertical separation between adjacent S-band radiating elements 284 in each column 282 of the second sub-array 280 is defined as the distance $VS_2$, and the distance between adjacent columns 292 of the third (Q-band) sub-array 290 is defined as the distance $HS_3$, and the vertical separation between adjacent Q-band radiating elements 294 in each column 292 of the third sub-array 290 is defined as the distance $VS_3$. Pursuant to embodiments of the present invention, the distances/separations $HS_1$, $VS_1$, $HS_2$, $VS_2$, $HS_3$, $VS_3$, may be set so that the partially-shared beamforming array 260 may provide improved performance as compared to the shared beamforming array 160 included in the conventional base station antenna of FIG. 1C.

In particular, as discussed above, optimum beamforming performance is typically achieved when the columns of the beamforming array are separated by a distance corresponding to about one-half of a wavelength of the center frequency of the RF signals that are transmitted and received through the beamforming array. Spacing the columns about a half wavelength apart also helps to suppress sidelobes and, in particular, grating lobes when the antenna beams are electronically scanned at large scan angles. Because less tilt angle is required, the radiating elements in each column of the beamforming array are typically spaced apart by less than 0.9 wavelengths of the center frequency of the RF signals that are transmitted and received through the beamforming array. In some applications, however, the radiating elements in each column of the beamforming array may be more closely spaced (less than 0.9 wavelengths), such as massive MIMO applications where three-dimensional beamforming is required. Since the beamforming array 260 includes three distinct sub-arrays 270, 280, 290, only one of which is shared across both T-band and S-band, the radiating elements 274 in the first sub-array 270 may be spaced apart from each other in the horizontal and vertical directions in a manner that is ideal for T-band communications, and the radiating elements 284 in the second sub-array 280 may be spaced apart from each other in the horizontal and vertical directions in a manner that is ideal for S-band communications. As such, the beamforming array 260 may exhibit improved performance as compared to the shared beamforming array 160 included in the conventional base station antenna of FIG. 1C.

In one example embodiment, the distance $HS_1$ between adjacent columns 272 of the first (T-band) sub-array 270 may be 60 mm and the vertical separation $VS_1$ between adjacent T-band radiating elements 274 in each column 272 of the first sub-array 270 may be 95 mm. In this embodiment, the distance $HS_2$ between adjacent columns 282 of the second (S-band) sub-array 280 may be 40 mm and the vertical separation $VS_2$ between adjacent S-band radiating elements 284 in each column 282 of the second sub-array 280 may be 70 mm, and the distance $HS_3$ between adjacent columns 292 of the third (Q-band) sub-array 290 may be 46 mm and the vertical separation $VS_3$ between adjacent Q-band radiating elements 294 in each column 292 of the third sub-array 290 may be 75 mm.

Two additional vertical separations are shown in FIG. 2D, namely vertical separation $VS_4$, which is the center-to-center vertical separation between highest T-band radiating element 274 in each column 262 and the lowest Q-band radiating element 294 in the column 262, and vertical separation $VS_5$, which is the center-to-center vertical separation between lowest S-band radiating element 284 in each column 262 and the highest Q-band radiating element 294 in the column 262. Typically, the vertical separation $VS_4$ is set to be similar or equal to $VS_1$, and the vertical separation $VS_5$ is set to be similar or equal to $VS_2$, although other values may be used. Setting the vertical separations $VS_4$ and $VS_5$ to these values may help balance the elevation pattern at both T-band and S-band.

It will be appreciated that in other embodiments the above-described distances may be varied. TABLE 1 below shows ranges for the various horizontal and vertical distances $HS_1$, $VS_1$, $HS_2$, $VS_2$, $HS_3$, $VS_3$ that may be used to implement the partially-shared beamforming array 260 in other embodiments of the present invention.

TABLE 1

| PARAMETER | RANGE (mm) |
|---|---|
| $HS_1$ | 57-63 |
| $VS_1$ | 90-100 |
| $HS_2$ | 37-43 |
| $VS_2$ | 65-75 |
| $HS_3$ | 43-49 |
| $VS_3$ | 70-80 |

It will also be appreciated that the distances $HS_1$, $HS_2$. $HS_3$, between adjacent columns in each sub-array 270, 280, 290 need not necessarily be exactly the same for every pair of columns on a respective sub-array 270, 280, 290. For example, the first and second columns 272-1, 272-2 of the first sub-array 270 could be separated by a first horizontal distance (e.g., 57 mm), the second and third columns 272-2, 272-3 of the first sub-array 270 could be separated by a second horizontal distance (e.g., 58 mm), and the third and fourth columns 272-3, 272-4 of the first sub-array 270 could be separated by the first horizontal distance (in this example, 57 mm). Thus, reference is made herein to the average distances between adjacent columns in the sub-arrays. In the above example, the average distance between adjacent columns in the first sub-array 270 would be 57.33 mm. It will likewise be appreciated that the vertical separations $VS_1$. $VS_2$, $VS_3$, between adjacent radiating elements in the columns of the various sub-arrays 270, 280, 290 also need not necessarily be exactly the same. In particular, the vertical separations between adjacent radiating elements in a particular column of a particular sub-array need not be exactly the same, nor must the vertical separations between adjacent radiating elements in different columns of a particular sub-array. Thus, reference is also made herein to the average vertical separation between adjacent radiating elements in the respective columns of a sub-array. This average vertical separation is determined by computing the average vertical separation between adjacent radiating elements in each column of a sub-array and then taking an average of these average vertical separations (assuming that all columns in the sub-array at issue have the same number of radiating elements).

Each of the first through third sub-arrays 270, 280, 290 may have a respective width $W_1$, $W_2$, $W_3$, where the widths $W_1$, $W_2$, $W_3$ correspond to the horizontal distance between the leftmost part of a radiating element in the leftmost column of the sub-array to the rightmost part of a radiating element in the rightmost column of the sub-array. These widths $W_1$, $W_2$, $W_3$ are shown graphically in FIG. 2D. As shown in FIG. 2D, in some embodiments $W_1>W_3>W_2$.

FIG. 2E is a block diagram of a feed network 263 for the partially-shared beamforming array 260 of base station antenna 200. As discussed above, the beamforming array 260 includes dual-polarized radiating elements. In order to simplify the drawing, FIG. 2E only illustrates the components of the feed network 263 for one polarization. It will be appreciated that all of the elements shown in FIG. 2E (except for the dual-polarized radiating elements and feedboards) will be duplicated for the second polarization.

As shown in FIG. 2E, each column 262 of radiating elements in beamforming array 260 may be viewed as comprising a column 242 of radiating elements of a T-band array 240 and as a column 252 of radiating elements of an S-band array 250. Each column 242 of radiating elements of the T-band array 240 comprises the T-band radiating elements 274 that are included in the corresponding column 272 of the first sub-array 270 and the Q-band radiating elements 294 that are included in the corresponding column 292 of the third sub-array 290. Similarly, each column 252 of radiating elements of the S-band array 250 comprises the S-band radiating elements 284 that are included in the corresponding column 282 of the second sub-array 280 and the Q-band radiating elements 294 that are included in the corresponding column 292 of the third sub-array 290.

The components of the feed network 263 that feed each column 262 of the beamforming array 260 may be identical. Thus, only the components of the feed network 263 that feed the first columns 262-1 of array 260 will be described. As shown in FIG. 2E, the first column 262-1 of beamforming array 260 is fed by both a T-band RF connector port and an S-band RF connector port of base station antenna 200 (these RF connector ports are two of the RF connector ports 208 shown in FIG. 2A).

The T-band RF connector port is coupled to a first T-band phase shifter assembly 264-1 that may divide the T-band RF signals input through the T-band RF port into three sub-components that are output at the three outputs of the first T-band phase shifter assembly 264-1. The first output of the first T-band phase shifter assembly 264-1 is coupled (via the feedboard 276) to the two T-band radiating elements 274 that are included in the first column 262-1. The second output of the first T-band phase shifter assembly 264-1 is coupled (via the lower feedboard 296-1) to the lower two Q-band radiating elements 294 that are included in the first column 262-1. The third output of the first T-band phase shifter assembly 264-1 is coupled (via the upper feedboard 296-2) to the upper two Q-band radiating elements 294 that are included in the first column 262-1. A first diplexer ("D") 268 is interposed between the second output of the first T-band phase shifter assembly 264-1 and the lower feedboard 296-1, and a second diplexer 268 is interposed between the third output of the first T-band phase shifter assembly 264-1 and the upper feedboard 296-2. In addition to sub-dividing the T-band RF signal into three sub-components, the first T-band phase shifter assembly 264-1 also imparts a phase taper across the three sub-components in a manner well understood to those of skill in the art in order to impart a desired amount of electronic downtilt to the T-band antenna beam that is generated by column 262-1 in response to the T-band RF signal. The phase shifter assembly 264-1 may be an adjustable phase shifter assembly so that the amount of electronic downtilt may be changed by changing the setting of the phase shifter assembly 264-1.

The S-band RF connector port is coupled to a first S-band phase shifter assembly 266-1 that may divide the S-band RF signals input through the S-band RF port into three sub-components that are output at the three outputs of the first S-band phase shifter assembly 266-1. The first output of the first S-band phase shifter assembly 266-1 is coupled (via the feedboard 286) to the two S-band radiating elements 284 that are included in the first column 262-1. The second output of the first S-band phase shifter assembly 266-1 is coupled (via the upper feedboard 296-2) to the upper two Q-band radiating elements 294 that are included in the first column 262-1. The third output of the first S-band phase shifter assembly 266-1 is coupled (via the lower feedboard 296-1) to the lower two Q-band radiating elements 294 that are included in the first column 262-1. The diplexers 268 allow RF signals input at both the T-band RF port and the S-band RF port to be fed to the Q-band radiating elements 294, and to split RF signals received at the Q-band radiating elements 294 so that the T-band RF signals are passed to the T-band RF port and so that the S-band RF signals are passed to the S-band RF ports, as is well understood in the art. In addition to sub-dividing the S-band RF signal into three sub-components, the first S-band phase shifter assembly 266-1 may be an adjustable phase shifter assembly that may impart a phase taper across the three sub-components in order to impart a desired amount of electronic downtilt to the S-band antenna beam that is generated by column 262-1 in response to an S-band RF signal.

Typically, sub-components of an RF signal that are fed to the radiating elements in the middle of each column of a beamforming array have a larger magnitude than the sub-components of an RF signal that are fed to the radiating elements near the top and bottom of each column. Configuring the radiating elements near the middle of each column to receive higher magnitude sub-components of the RF signal may advantageously provide better sidelobe suppression without degrading the directivity and gain. This unequal power split can be accomplished by using unequal power dividers in the phase shifter assemblies 264, 266 shown in FIG. 2E. However, in the partially-shared beamforming arrays according to some embodiments of the present invention, the shared radiating elements may be fed with relatively lower power sub-components in order to minimize the insertion loss attributable to the diplexers 268 that are included on the feed paths to the shared radiating elements 294. In some embodiments, at least some of the sub-components of an RF signal that are passed to non-shared radiating elements 274, 284 of a beamforming array may have a larger magnitude than at least some of the sub-components of an RF signal that are passed to shared radiating elements 294 of the beamforming array. This may improve the performance of the beamforming array by reducing the insertion loss.

It will be appreciated that the base station antenna 200 illustrates one specific example of an embodiment of the present invention, and may be modified in many ways. For example, in FIGS. 2B-2E the beamforming array 260 is shown as including four columns 262 of radiating elements, it will be appreciated that other numbers of columns may be used. For example, in other embodiments the beamforming array may include eight, twelve, sixteen or thirty-two columns. As another example, in FIGS. 2B-2E, each T-band sub-array 270 includes two radiating elements 274 per column, each S-band sub-array 280 includes two radiating elements 284 per column, and each Q-band sub-array 290 includes four radiating elements 294 per column. It will be appreciated that the number of each type of radiating element 274, 284, 294 per column 262 may be varied based on, among other things, the requirements for the elevation beamwidth of the T-band and S-band antenna beams and the amount of available space on the reflector 214 for the beamforming array 260. For example, if the narrower elevation beamwidths are required, then the number of radiating elements per column may be increased. To the extent that room is available on the reflector 214, the additional radiating elements may be added as additional T-band and S-band radiating elements in order to (1) reduce diplexer losses and (2) have as many radiating elements as possible be spaced in the horizontal and vertical directions from other radiating elements at optimum distances. It will also be understood that the phase shifter assemblies 264, 266 may have different numbers of outputs, and that each output of the phase shifter assemblies 264, 266 may feed any number of radiating elements (e.g., one, two, three, etc.).

It will also be appreciated that the beamforming arrays according to embodiments of the present invention can operate in other frequency bands than T-band and S-band. Any two frequency bands may be used. As an example, the T-band radiating elements 274 in base station antenna 200 could be replaced with radiating elements that operate in the 2.1-2.3 GHz frequency band, the S-band radiating elements 284 could be designed to operate in the 3.3-3.8 GHz frequency band, and the Q-band radiating elements 294 could be replaced with radiating elements that operate in the 2.1-3.8 GHz frequency band to provide a base station antenna with a first beamforming array that operates in the 2.1-2.3 GHz frequency band and a second beamforming array that operates in the 3.3-3.8 GHz frequency band. Many other combinations of frequency bands may be used.

Figure 3:
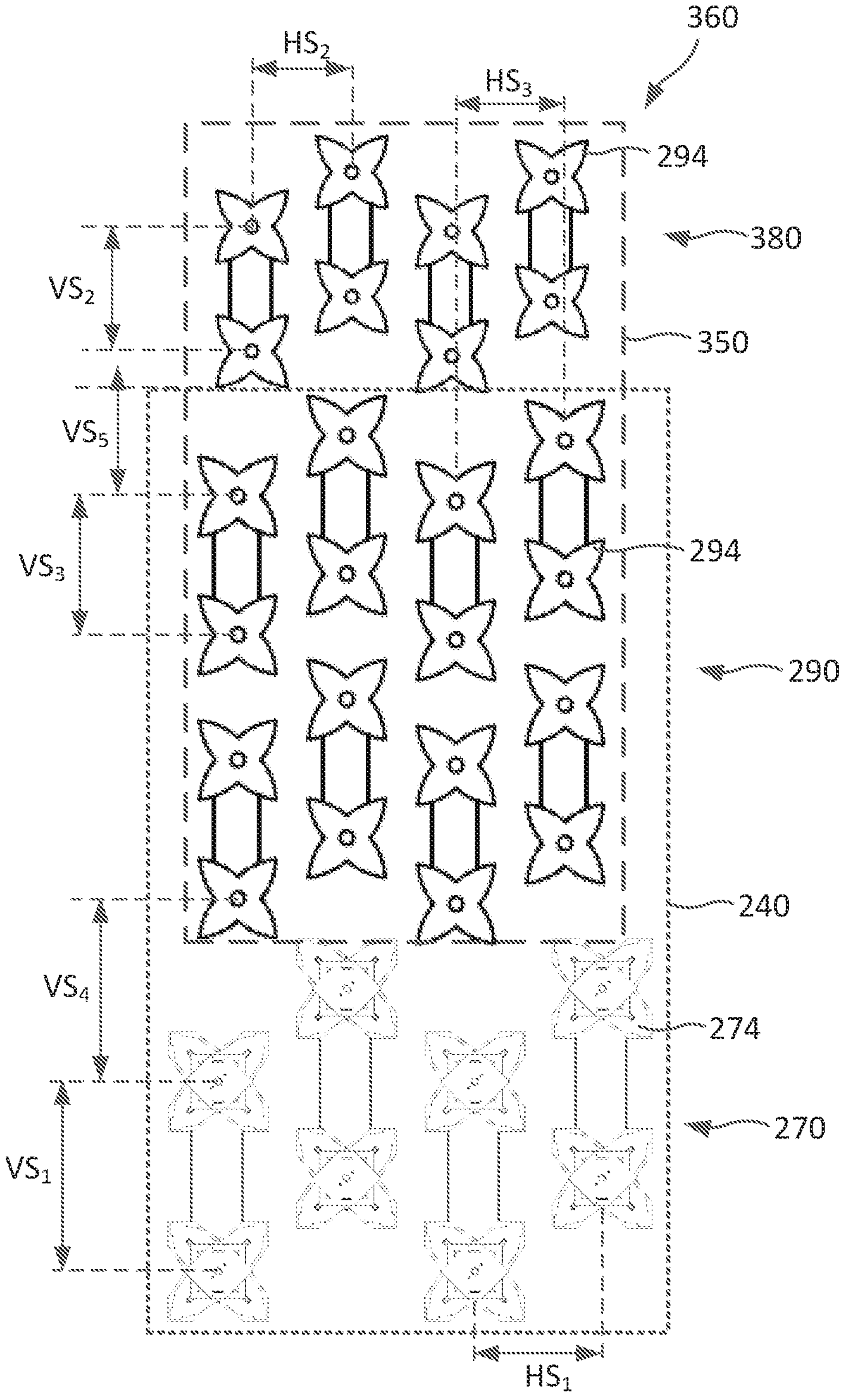
FIG. 3 is a schematic front view of a multiband beamforming array according to further embodiments of the present invention that may be used in place of the multiband beamforming array of the base station antenna of FIGS. 2A-2E.

FIG. 3 is a schematic front view of a multiband beamforming array 360 according to further embodiments of the present invention that may be used in place of the multiband beamforming array 260 of the base station antenna 200 of FIGS. 2A-2B.

As can be seen by comparing FIGS. 2C and 3, the beamforming array 360 may be very similar to beamforming array 260. The primary difference between the two beamforming arrays 260, 360 is that in beamforming array 360 the second sub-array 380 is formed using Q-band radiating elements 294 as opposed to using S-band radiating elements 284. The various distances/separations $HS_1$, $VS_1$, $HS_2$, $VS_2$, $HS_3$, $VS_3$, $VS_4$, $VS_5$ may be the same as discussed above with reference to beamforming array 260. The use of three different types of radiating elements 274, 284, 294 in the beamforming array 260 may have certain advantages, as it allows each radiating element to be optimized for its intended frequency band of operation. Thus, for example, using S-band radiating elements 284 to implement the second sub-array 280 as is done in beamforming array 260 may help minimize the return loss for the S-band beamforming array 260. However, another consideration is that each different type of radiating element has a different phase center. When beamforming is performed, the resultant radiation pattern is a combination of the patterns of the individual radiating elements and the array factor. In order to provide the best beamforming performance, particularly when the above-discussed phase shifter assemblies 264, 266 are used to apply an electronic downtilt to the antenna beams, it is desirable to have the phase centers (in the vertical plane) for each column of radiating elements to be the same. Different radiating elements, however, may have different phase centers when they are excited transmitting or receiving an RF signal. As such, the use of different radiating elements has an impact on the overall beamforming performance. This impact may be at least partly compensated for in the feed network for the beamforming array (e.g., by using phase cables having different lengths for different types of radiating element), but this may complicate the design of the feed network and may not fully compensate for the difference in phase centers. Thus, in some application, it may be advantageous to implement the beamforming array using only two different types of radiating elements.

In some embodiments the various average distances between columns $HS_1$, $HS_2$, $HS_3$ as well as the average vertical separation of the adjacent radiating elements within the columns $VS_1$, $VS_2$, $VS_3$ may be different for each sub-array 270, 280, 290 (i.e., $HS_1 \neq HS_2 \neq HS_3$ and $VS_1 \neq VS_2 \neq VS_3$). This may allow each parameter to be optimized for the frequency band of operation of the radiating elements within the particular sub-array. However, it will be appreciated that at least some of the benefits of the techniques according to embodiments of the present invention may be realized by having one of $HS_1$, $HS_2$, $HS_3$ be different from the other two, and/or by having one of $VS_1$, $VS_2$, $VS_3$ be different from the other two. Thus, embodiments of the present invention cover all variants where at least one of $HS_1$, $HS_2$, $HS_3$ is different from the other two of $HS_1$, $HS_2$, $HS_3$, and/or at least one of $VS_1$, $VS_2$, $VS_3$ is different from the other two of $VS_1$, $VS_2$, $VS_3$.

Figure 4:
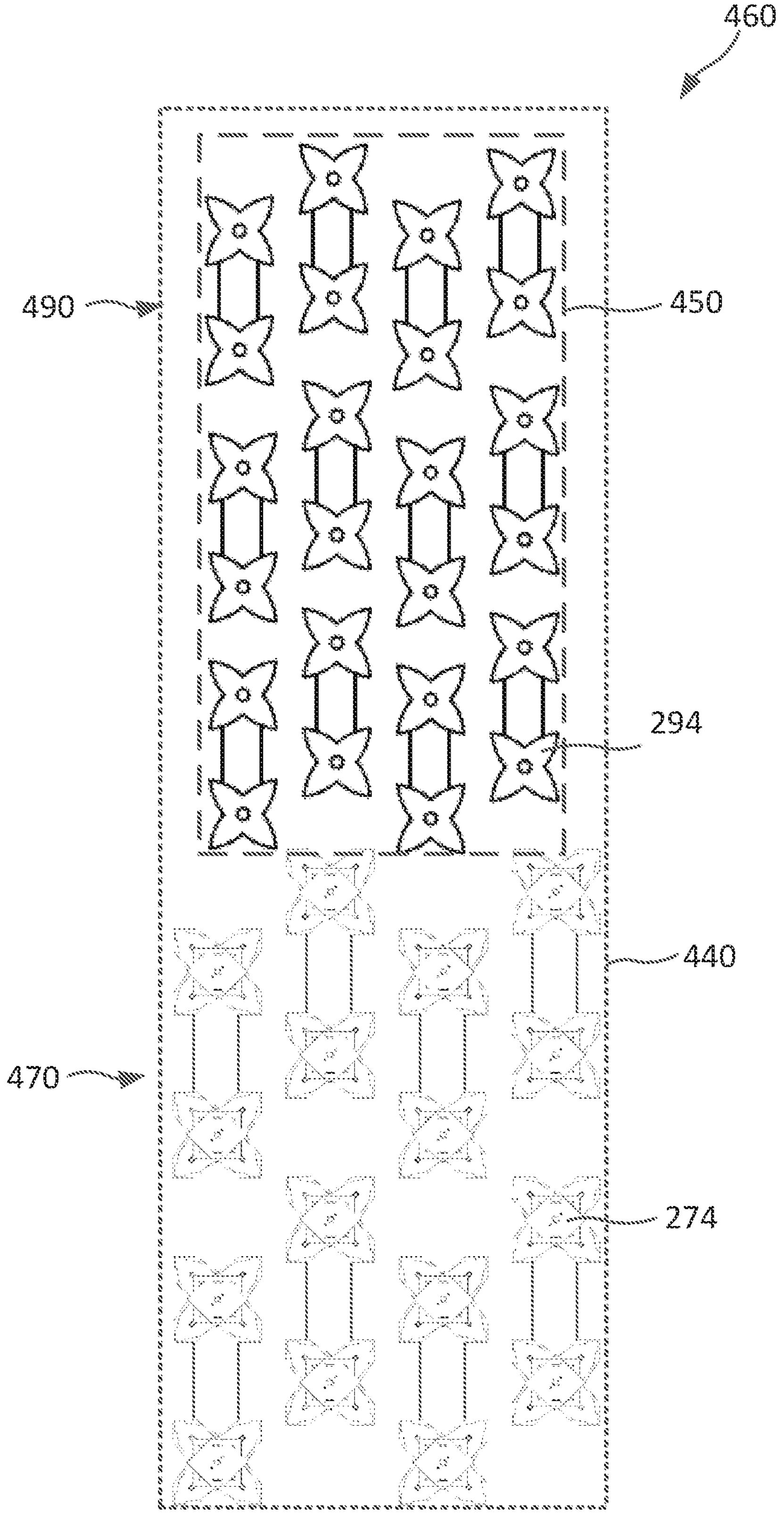
FIG. 4 is a schematic front view of a multiband beamforming array according to still further embodiments of the present invention that includes two distinct sub-arrays.

While the partially-shared beamforming arrays according to embodiments of the present invention discussed above include three distinct sub-arrays, embodiments of the present invention are not limited thereto. For example, in some applications partially-shared beamforming arrays may be provided that only include two distinct sub-arrays. FIG. 4 is a schematic front view of a multiband beamforming array 460 according to still further embodiments of the present invention that only includes two distinct sub-arrays. The beamforming array 460 may be particularly useful in applications where the elevation beamwidth requirements for the two single-band beamforming arrays included in multiband beamforming array 460 are significantly different.

In particular, cellular operators may have different requirements for the elevation beamwidth of the antenna beams that are generated in different frequency bands of a multiband antenna at a macrocell base station. Such different requirements may arise, for example, because neighboring macrocell base stations may not support service in all of the frequency bands and/or because of small cell base stations located within the coverage area of the macrocell base station. In the example of FIG. 4, it is assumed that to meet the relatively narrower elevation beamwidth requirements at T-band a total of ten radiating elements per column is required, while to meet the relatively broader elevation beamwidth requirements at S-band a total of six radiating elements per column is required. If, for example, there was room on the reflector of the base station antenna for twelve radiating requirements per column, a partially-shared beamforming array having the general design of the beamforming array 260 of FIG. 2C could be used, where each column 272 in the first T-band sub-array 270 includes six radiating elements 274 per column 272, each column 282 in the second S-band sub-array 280 includes two radiating elements 284 per column 282, and each column 292 in the third Q-band sub-array 290 includes four radiating elements 294 per column 292. However, if there is only room on the reflector of the base station antenna for ten radiating requirements per column then such a design could not be used, as all of the radiating elements in a column would need to support T-band communications.

As shown in FIG. 4, under these circumstances, a beamforming array 460 may be provided that only includes a first sub-array 470 of T-band radiating elements 274 and a third sub-array 490 of Q-band radiating elements 294. The first sub-array 470 may include four T-band radiating elements 274 per column, and the third sub-array 490 may include six Q-band radiating elements 294 per column. The Q-band radiating elements 294 may be diplexed in the manner discussed above with reference to FIG. 2E. This results in a T-band beamforming array 440 that includes ten radiating elements per column and an S-band beamforming array 450 that includes six radiating elements per column. The S-band beamforming array 450 is a fully diplexed array and hence may have insertion losses similar to the S-band portion of the beamforming array 160 of the conventional antenna 100C of FIG. 1C. However, the T-band beamforming array 440 may exhibit improved performance since four of the radiating elements in each column may be optimized for T-band performance.

Figure 5:
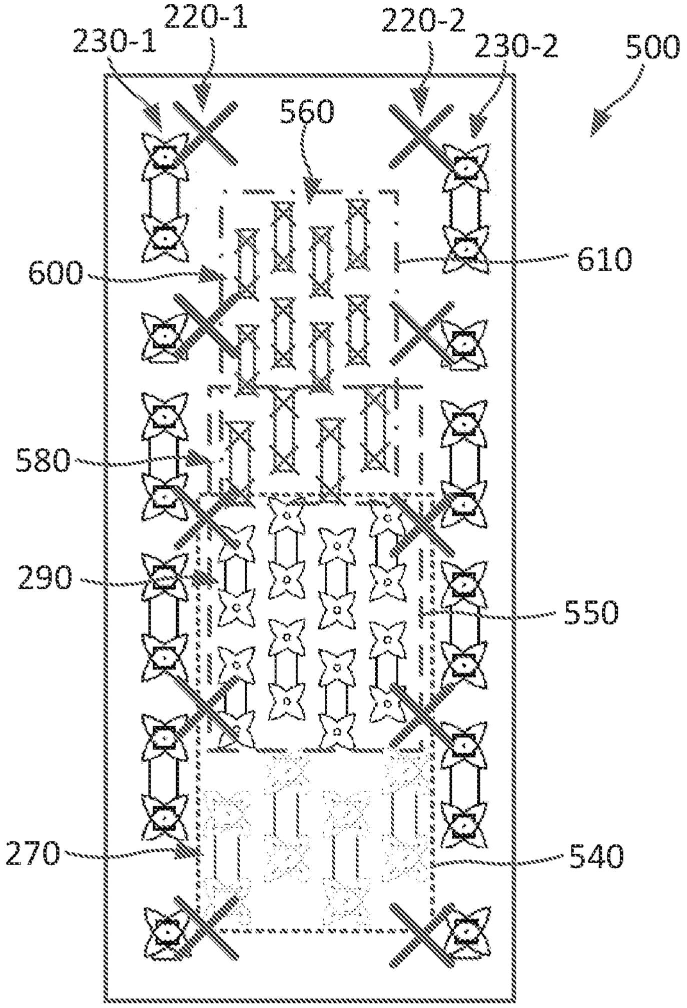
FIG. 5 is a schematic front view of a base station antenna according to still further embodiments of the present invention that has a multiband beamforming array that includes only two sub-arrays.

The above example embodiments of the present invention are directed to partially-shared beamforming arrays that include two single-band beamforming arrays. It will be appreciated that the concepts of the present invention may be expanded to provide partially-shared beamforming arrays that include more than two single-band beamforming arrays. FIG. 5 is a schematic front view of a base station antenna 500 according to further embodiments of the present invention that includes such a multiband beamforming array 560.

As shown in FIG. 5, the base station antenna 500 may be very similar to the base station antenna 200 of FIGS. 2A-2E, except that (1) the base station antenna 500 includes more radiating elements than base station antenna 200 in each of the low-band and mid-band linear arrays 220, 230 and (2) the multiband beamforming array 560 includes a total of four sub-arrays, namely a first sub-array 270, a second sub-array 580, a third sub-array 290, and a fourth sub-array 600. The sub-arrays 270 and 290 of beamforming array 560 may be identical to the like-numbered sub-arrays of beamforming array 260 and hence further description thereof will be omitted. The fourth sub-array 600 that is not present in beamforming array 260 includes four columns of radiating elements that are configured to operate in some or all of the 5100-5800 MHz frequency band (herein the "P-band").

The second sub-array 580 of beamforming array 560 may be similar to sub-array 280 of beamforming array 260 except that the radiating elements in the second sub-array 580 are diplexed so that they may transmit and receive both S-band and P-band RF signals. Thus, as shown in FIG. 5, the multiband beamforming array 560 may act as three single-band beamforming arrays with the first and third sub-arrays 270, 290 acting as a T-band beamforming array 540, the second and third sub-arrays 580, 290 acting as an S-band beamforming array 550, and the second and fourth sub-arrays 580, 600 acting as a P-band beamforming array 610. It will be appreciated that the concept of the present invention may be further extended to support beamforming in additional frequency bands.

The base station antennas according to embodiments of the present invention may provide improved performance as compared to comparable conventional base station antennas. As discussed above, by partially sharing radiating elements across two single-band beamforming arrays, it is possible to fit all of the arrays desired by cellular operators within base station antennas that meet cellular operator requirements for the width and length of the antenna. Additionally, by only sharing some of the radiating elements of the multiband beamforming arrays across the single-band arrays it is possible to improve the performance of one or both of the single-band beamforming arrays. Moreover, the techniques according to embodiments of the present invention are very flexible in that the number of radiating elements shared across multiple single-band beamforming arrays may be varied based on the available space within the antenna, thereby allowing each individual antenna design to achieve the amount of performance improvement that is possible based on the amount of room available.

It will be appreciated that the present specification only describes a few example embodiments of the present invention and that the techniques described herein have applicability beyond the example embodiments described above.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

That which is claimed is:

1. A base station antenna, comprising:

a multi-column, multiband, longitudinally-extending beamforming array comprising a first sub-array of first radiating elements, a second sub-array of second radiating elements and a third sub-array of third radiating elements, wherein the first radiating elements are configured to operate in a first frequency band, wherein the second radiating elements are configured to operate in a second frequency band that is different from the first frequency band, wherein the third radiating elements are configured to operate in both the first frequency band and the second frequency band, wherein each of the first through third sub-arrays has a same number of columns, wherein a width of the first sub-array exceeds a width of the third sub-array, and wherein the width of the third sub-array exceeds a width of the second sub-array.

2. The base station antenna of claim 1, wherein the third sub-array is positioned between the first sub-array and the second sub-array.

3. The base station antenna of claim 1, wherein an average spacing in a longitudinal direction between the first radiating elements in a first column of the first sub-array exceeds an average spacing in the longitudinal direction between the third radiating elements in a first column of the third sub-array.

4. The base station antenna of claim 3, wherein the average spacing in the longitudinal direction between the third radiating elements in the first column of the third subarray exceeds an average spacing in the longitudinal direction between the second radiating elements in a first column of the second sub-array.

5. The base station antenna of claim 1, wherein the second radiating elements have a same design as the third radiating elements but have a different design than the first radiating elements.

6. The base station antenna of claim 1, wherein the first radiating elements have a different design than the second radiating elements and the third radiating elements, and wherein the second radiating elements have a different design than the third radiating elements.

7. The base station antenna of claim 1, wherein the first frequency band is at lower frequencies than the second frequency band.

8. The base station antenna of claim 1, wherein at least some of the first radiating elements are configured to receive higher power sub-components of a first frequency band RF signal than are at least some of the third radiating elements.

9. The base station antenna of claim 1, wherein at least some of the second radiating elements are configured to receive higher power sub-components of a second frequency band RF signal than are at least some of the third radiating elements.

* * * * *